United States Patent
Shinde et al.

(10) Patent No.: US 10,284,586 B1
(45) Date of Patent: May 7, 2019

(54) DATA LOSS PREVENTION TECHNIQUES FOR APPLICATIONS WITH SAVE TO WEB FUNCTIONALITY

(71) Applicant: SYMANTEC CORPORATION, Mountain View, CA (US)

(72) Inventors: Ameet Shinde, Pune (IN); Varsha Arun Raykar, Pune (IN); Sarin Sumit Manmohan, Pune (IN)

(73) Assignee: Symantec Corporation, Mountain View, CA (US)

( * ) Notice: Subject to any disclaimer, the term of this patent is extended or adjusted under 35 U.S.C. 154(b) by 123 days.

(21) Appl. No.: 14/581,341

(22) Filed: Dec. 23, 2014

(51) Int. Cl.
  *G08B 23/00* (2006.01)
  *G06F 12/16* (2006.01)
  *G06F 12/14* (2006.01)
  *G06F 11/00* (2006.01)
  *H04L 29/06* (2006.01)
  *H04L 29/08* (2006.01)

(52) U.S. Cl.
  CPC .......... *H04L 63/1433* (2013.01); *H04L 67/06* (2013.01)

(58) Field of Classification Search
  CPC ............................ H04L 63/1433; H04L 67/06
  USPC .......................................................... 726/25
  See application file for complete search history.

(56) References Cited

U.S. PATENT DOCUMENTS

| | | | |
|---|---|---|---|
| 8,499,152 B1* | 7/2013 | Chen | H04L 63/102 713/155 |
| 8,739,272 B1* | 5/2014 | Cooper | H04L 63/20 726/11 |
| 9,064,130 B1* | 6/2015 | Asheghian | G06F 21/6281 |
| 2010/0043047 A1* | 2/2010 | Archer | H04L 63/1416 726/1 |
| 2013/0191627 A1* | 7/2013 | Ylonen | H04L 63/1483 713/150 |
| 2013/0191631 A1* | 7/2013 | Ylonen | H04L 63/1483 713/153 |
| 2014/0165137 A1* | 6/2014 | Balinsky | G06F 21/554 726/1 |
| 2015/0269386 A1* | 9/2015 | Khetawat | G06F 21/62 726/1 |

OTHER PUBLICATIONS

Richard Chow ; Controlling Data in the Cloud ; Fujitsu Laboratories of America ; 2009; p. 1-6.*

* cited by examiner

*Primary Examiner* — Monjur Rahim
(74) *Attorney, Agent, or Firm* — Patterson + Sheridan, LLP

(57) ABSTRACT

Techniques presented herein describe data loss prevention (DLP) methods for saving a file to a destination over a network via an application, such as a productivity application having such features. A DLP agent injects components to the productivity application intercept save operations initiated by a user. When the user initiates a save operation for a file, the components suspend the operation and store a current version of the file (including unsaved file data) in a temporary location accessible to the DLP agent on disk. The DLP agent evaluates the current version of the file and file destination based on network and security policies to determine whether to allow or block the save operation.

17 Claims, 5 Drawing Sheets

DATA LOSS PREVENTION TECHNIQUES FOR APPLICATIONS WITH SAVE TO WEB FUNCTIONALITY

BACKGROUND

Field

Embodiments of the present disclosure generally relate to data loss prevention (DLP). More specifically, embodiments presented herein provide techniques to prevent data loss events resulting from save to web features of productivity software.

Description of the Related Art

Productivity software, such as word processors, image editors, presentation software, communication applications (e.g., email and messaging tools) spreadsheet applications, and other common productivity tools, allow users to complete various tasks on a computer. For example, users can create and edit documents on a word processor, manipulate digital photographs in an image editor, and enter data into spreadsheets.

Further, many productivity applications provide support for directly saving data to a remote location over a network, such as features for sending content directly to a cloud storage repository or for posting content as a web-page hosted by a remote web-server. That is, rather than save a document locally on a storage drive and manually uploading the file to a server through a network protocol application or a web interface, the user can click on a "Save to Web" feature (or similar) from a file menu of the productivity application and choose a specified location for uploading. In turn, the productivity application automatically uploads the document to the desired destination. Such a feature allows users to easily collaborate on documents and share content with the public (e.g., through a blog). In particular, some organizations use "Save to Web" functionality by integrating productivity software with content management systems. For example, an enterprise client can use the "Save to Web" feature to save content directly to a content management system.

However, one drawback with features like "Save to Web" is the risk of data leakage. Continuing the previous example of a content management system, a user can have access to sensitive data stored on the content management system, such as credit card information, social security numbers, or other sensitive information that enterprise customers depend on being stored securely by the enterprise. Further, in some cases, legal, regulatory, or contractual obligations require that such information remain secure within an organization.

Accordingly, although productivity software provides useful benefits to users with Save to Web features, the features themselves should not become a source of data leaks.

SUMMARY

One embodiment presented herein describes a method for preventing data loss by monitoring publication features of an application. This method may generally include detecting a request for the application to transfer a file to a network location, suspending the request, and storing a current version of the file in a temporary location accessible to a data loss prevention (DLP) agent. This method may also include evaluating, by the DLP agent, the current version of the file and the specified destination against a security policy. The request to transfer the file to the network location is either cancelled or resumed based on the evaluation of the DLP agent.

Another embodiment includes a computer-readable storage medium storing instructions, which, when executed on a processor, perform an operation for preventing data loss by monitoring publication features of an application. This operation may generally include detecting a request for the application to transfer a file to a network location, suspending the request, and storing a current version of the file in a temporary location accessible to a data loss prevention (DLP) agent. This operation may also include evaluating, by the DLP agent, the current version of the file and the specified destination against a security policy. The request to transfer the file to the network location is either cancelled or resumed based on the evaluation of the DLP agent.

Still another embodiment includes a system having a processor and a memory and a memory hosting a program, which, when executed on the processor, performs an operation for preventing data loss by monitoring publication features of an application. This operation may generally include detecting a request for the application to transfer a file to a network location, suspending the request, and storing a current version of the file in a temporary location accessible to a data loss prevention (DLP) agent. This operation may also include evaluating, by the DLP agent, the current version of the file and the specified destination against a security policy. The request to transfer the file to the network location is either cancelled or resumed based on the evaluation of the DLP agent.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
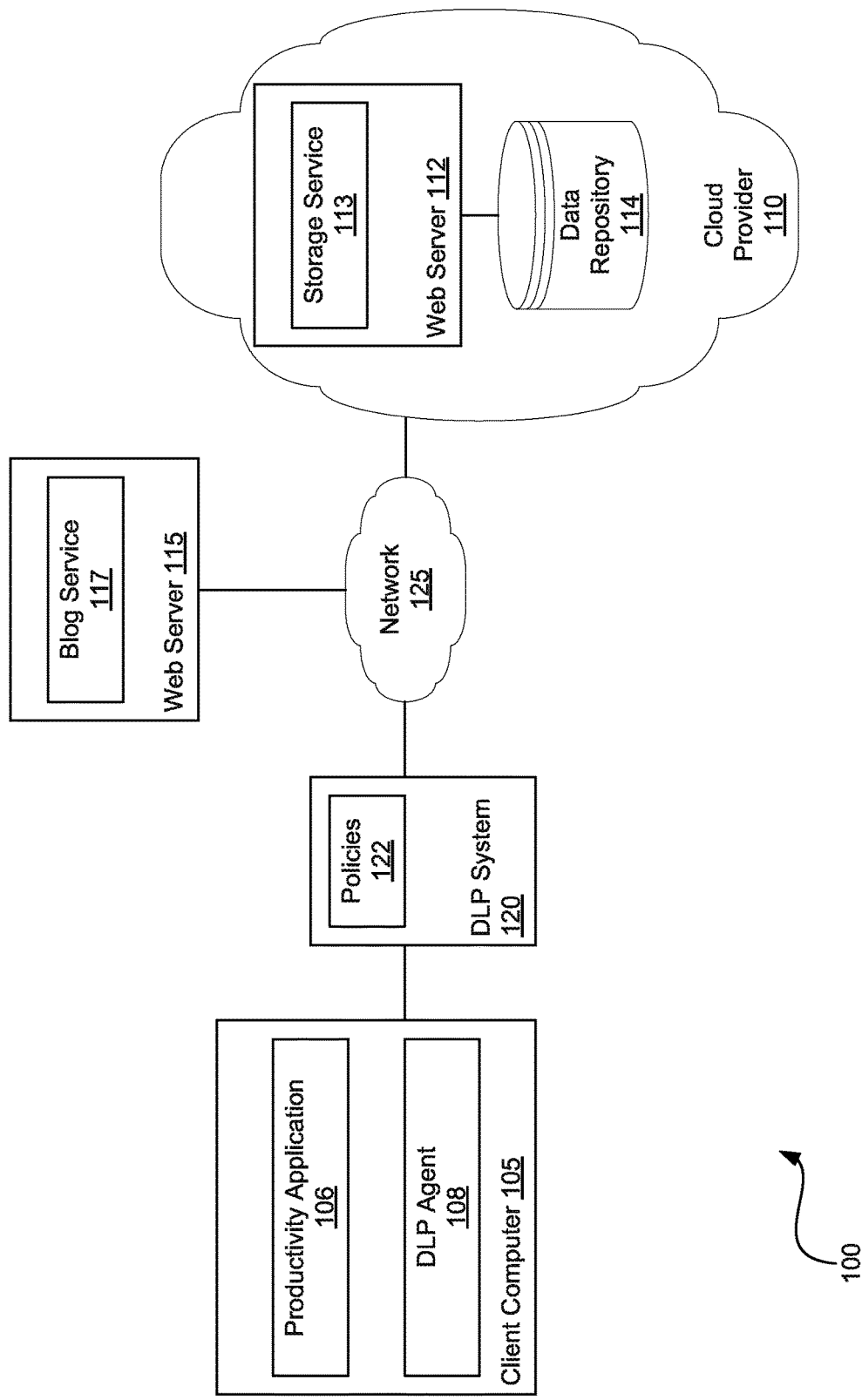
FIG. 1 illustrates an example computing environment, according to one embodiment.

Many current productivity applications allow a user to save a document directly to a remote destination over a network (e.g., a cloud storage service, content management system, etc). In some cases, a productivity application may cache a copy of given document on a client system in a location using a proprietary format to track incremental changes made to the document while being accessed by a user. However, doing so may obscure content of the file in the temporary location from being monitored by a data loss prevention (DLP) monitoring tool. Further, when saving the document to a remote location, the productivity application uses a proprietary protocol. The protocol itself might use differential uploading, i.e., splitting the document into chunks and uploading only the portions modified to the remote location. For example, the protocol may do so for some cloud services that allow online editing of a document. A copy of the document can be saved to the client for local editing. When a user subsequently saves the document through the Save to Web feature, the protocol may upload only the saved differential portions to the cloud service to preserve network bandwidth. Again, such techniques made by the productivity application can obscure content of the file to the DLP monitoring tool. For these reasons, intercepting and scanning the document (when detecting that the Save to Web feature has been activated) to ensure that sensitive data is not being transmitted to an unauthorized location is difficult.

Embodiments presented herein provide techniques for detecting instances where sensitive data is being sent to a remote location through a "Save to Web" (or similar) feature of a productivity application (e.g., word processor, spreadsheet application, and the like). In one embodiment, the client system includes a DLP agent that communicates with a DLP system. The DLP system enforces policies to prevent sensitive or protected data from being sent to an unauthorized destination.

The DLP agent provides a plug-in to retrieve an in-memory copy of the file. The DLP agent also provides a component used to intercept file and network application programming interfaces (APIs) of the productivity application. When a user opens the productivity application, the DLP agent integrates both the DLP plug-in and the interception component into the application.

In one embodiment, when the interception component detects that a user has initiated a save operation on a file targeted at a remote location, the component suspends the operation and retrieves the identity of the remote location. The DLP plug-in then retrieves an in-memory copy of the file to be saved using the intercepted file API. Further, to prevent leakage at this point, the DLP plug-in encrypts the file. The plug-in stores the encrypted file into a temporary location accessed by the DLP system. Doing so allows the DLP system to evaluate the file against a data loss policy. The interception component either allows or blocks the save operation based on the result of the evaluation. If allowed, the interception component resumes the save operation and allows the productivity application to proceed with the save. However, if blocked, the interception component prevents the save operation from occurring and returns an error to the user.

Embodiments described herein provide an approach for preventing sensitive data from being leaked to unauthorized locations. The interception component can suspend a requested file save operation and retrieve a full copy of a requested file to be saved to a remote location through the DLP plug-in. Advantageously, doing so provides the DLP system with the entire file to evaluate for sensitive data. Further, the DLP plug-in and interception component act when a user initiates a save operation. That is, the DLP components do not obstruct any other processes of the productivity application, such as an auto-save or to save operations to a local disk.

Note, the following references productivity software as an example of an application that allows users to save data to a specified storage location, such as a content management system, cloud data repository, blog service, and the like. However, one of ordinary skill in the art will recognize that embodiments presented herein are applicable to other types of applications that support direct save operations to a server located in an external location. For example, an e-mail client may allow a user to export messages to a content management system or other destinations. The DLP system (e.g., via an agent application) can inject interception and plug-in components into the productivity application that intercept calls to file and network APIs, provided that the application supports such integration. Thus, whenever an administrator attempts to save an e-mail message, the interception component can intercept the save operation, retrieve the e-mail and save destination information, and determine whether the save operation conforms to a specified policy. The plug-ins can then allow or block the save operation based on the determination.

FIG. 1 illustrates a computing environment 100, according to one embodiment. As shown, the computing environment 100 includes a client computer 105. The client computer 105 may be a physical computer system or a virtual machine instance running in a cloud computing network. As shown, the client computer 105 includes a productivity application 106. The productivity application 106 can be a variety of applications allowing a user to complete a task, such as a word processor, spreadsheet application, presentation application, etc. Generally, the productivity application 106 allows the user to create and edit documents having a format supported by the particular productivity application.

Further, the productivity application 106 may allow users to save a document to a remote location over a network 125. For example, the application 106 may provide a variety of web publishing features capable of saving application content (e.g., a word processing document) to a data repository 114 provided by a cloud provider 110. The cloud provider 110 can include a web server 112 hosting a storage service 113 that the productivity application 106 communicates with to upload the document. As another example, the user can directly save the document to storage hosted by a blog service 117 (executing on a web server 115). Such a feature allows the user to save any document directly to a storage system located in a remote location.

Typically, to save the document to a remote location, the productivity application 106 first writes data corresponding to the document to a temporary directory for caching in response to request to publish the document to a web server. Further, in some cases, the productivity application 106 divides the document into chunks for differential uploading to preserve network bandwidth. The productivity application 106 uses a proprietary protocol to send the chunks of the file to a specified destination. In some cases, the protocol only sends chunks corresponding to modified portions of the document to the specified destination. For example, some cloud services that allow online editing of a document uploaded to the service. A copy of the document can be saved to the client for local editing. When a user subsequently saves the document through the Save to Web feature, the productivity application 106 may send only the saved portions to the cloud service to preserve network bandwidth.

A concern about such "Save to Web" functionality is the risk of data leakage, e.g., when a user saves sensitive data to a location that is unauthorized according to a network policy. For example, the client computer 105 may be part of a network of an organization. A user may have access to data deemed sensitive to the organization, such as personal information, credit card numbers, and the like.

In one embodiment, a DLP agent 108 executing on the client computer 105 monitors documents being sent over the network 125 from the productivity application 106 in response to a "Save to Web" operation to ensure that the user is not transmitting sensitive data (e.g., credit card information, personal information, etc.) to an unauthorized location. The DLP agent 108 includes a configuration specifying applications known to have web integration features and monitors those applications (e.g., productivity application 106). The DLP agent 108 communicates with a DLP system 120, which enforces a set of DLP policies 122 (e.g., specified by an administrator of the organization). As described below, the DLP agent 108 analyzes files sent via a "Save to Web" (or similar) feature in the productivity application 106 over the network 125 relative to the policies 122 to ensure that sensitive data is not transmitted to unauthorized locations. For example, the DLP agent 108 can evaluate a given document relative to the policies 122 using known techniques, such as machine learning algorithms, regular expression analysis, and the like. The DLP agent 108 can determine whether to allow or block files from being sent to a given remote storage location based on the policies 122.

Figure 2:
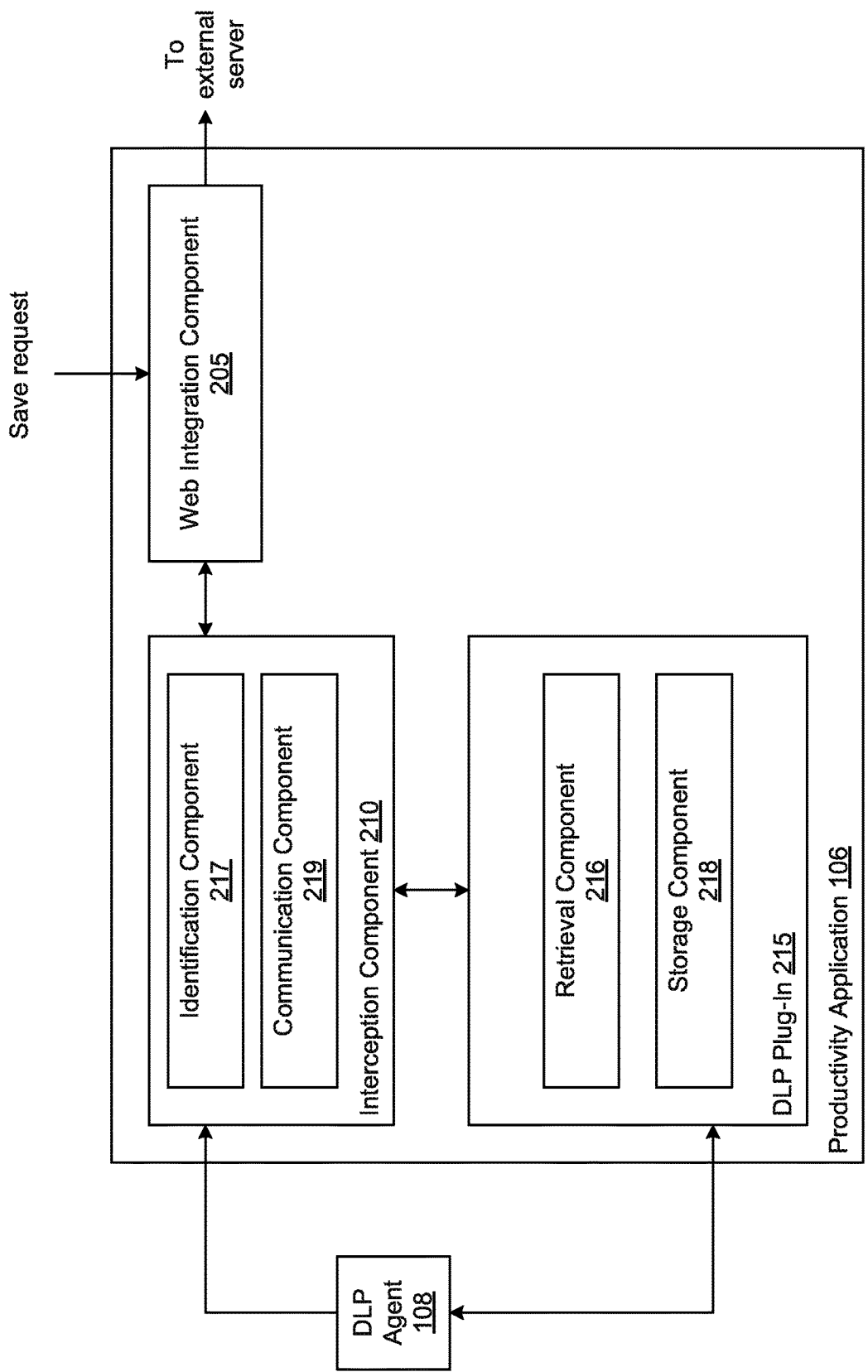
FIG. 2 illustrates further illustrates the productivity application and data loss prevention (DLP) plug-in described relative to FIG. 1, according to one embodiment.

FIG. 2 illustrates an example of DLP components integrated with the productivity application 106, according to one embodiment. In one embodiment, the DLP agent 108 injects an interception component 210 and a DLP plug-in 215 into the productivity application 106. The DLP agent 108 may do so when the user first opens the productivity application 106. The DLP plug-in 215 may be based on the IDTExtensibility2 interface for use in Microsoft Office productivity software.

Once integrated, the interception component 210 obtains access to the web integration components 205 (e.g., file API and network API of the application 106). Doing so allows the interception component 210 to track, using the file API, content written to a temporary location as part of a "Save to Web" (or similar) feature. That is, the productivity application 106 writing data to the temporary location indicates that the productivity application 106 is caching the data prior to uploading or publishing the data to a network location apart from the regular "Save File" mechanism provided by the productivity application 106. The interception component 210 suspends the activity. Note, in the case where the productivity application 106 provides auto-save functionality, the application 106 typically caches the data in a separate temporary location. Therefore, the interception component 210 disregards writes directed towards the auto-save location. As a result, the productivity application 106 can continue to perform auto-saves without being hindered by the DLP components.

As shown, the DLP plug-in 215 further includes a retrieval component 216 and a storage component 218. Further, the interception component 210 includes an identification component 217 and communication component 219. In one embodiment, after the interception component 210 suspends a save operation, the retrieval component 216 obtains the content written to the temporary location prior to being published via a "Save to Web" (or similar) feature. To do so, the DLP plug-in 215 may retrieve an active document object provided by the IDTExtensibility2 interface of the productivity application 106. The active document object is an in-memory version of the file that the productivity application 106 can persist to disk. Further, the active document object includes unsaved data associated with the file.

In one embodiment, the identification component 217 determines an intended save destination of the file using the network API of the productivity application 106. For example, assume the user desires to save the file to the cloud data repository 114. In this case, the identification component 217 may obtain, through the network API of the productivity application 106, a network address for the destination web server 112, the destination file path, etc. The identification component 217 stores the saved destination information for the DLP agent 108 to evaluate.

In one embodiment, the storage component 218 encrypts the active document and stores the encrypted file in a temporary location on disk that is accessible to the DLP agent 108. Note, this temporary location may be distinct from the temporary location used by the productivity application 106 to cache the file prior to an auto-save operation. By using a distinct temporary location, the DLP components do not obstruct a regular auto-save operation.

In one embodiment, the communication component 219 transmits the file destination information and temporary file location information to the DLP agent 108. Doing so allows the DLP agent 108 to evaluate whether the save operation to a remote location (i.e., made via the Save to Web feature) conforms with the DLP policies 122. The communication component 219 receives a decision from the DLP agent 108 to either allow the save operation to occur or to block the save operation from occurring. If allowed, the communication component 219 transmits instructions to the interception component 210 to resume the save to web operation. Once unsuspended, an upload protocol of the web integration component 205 saves the file to an external server destination. However, if blocked, the communication component 219 transmits instructions to the interception component 210 to cancel the save to web operation.

Figure 3:
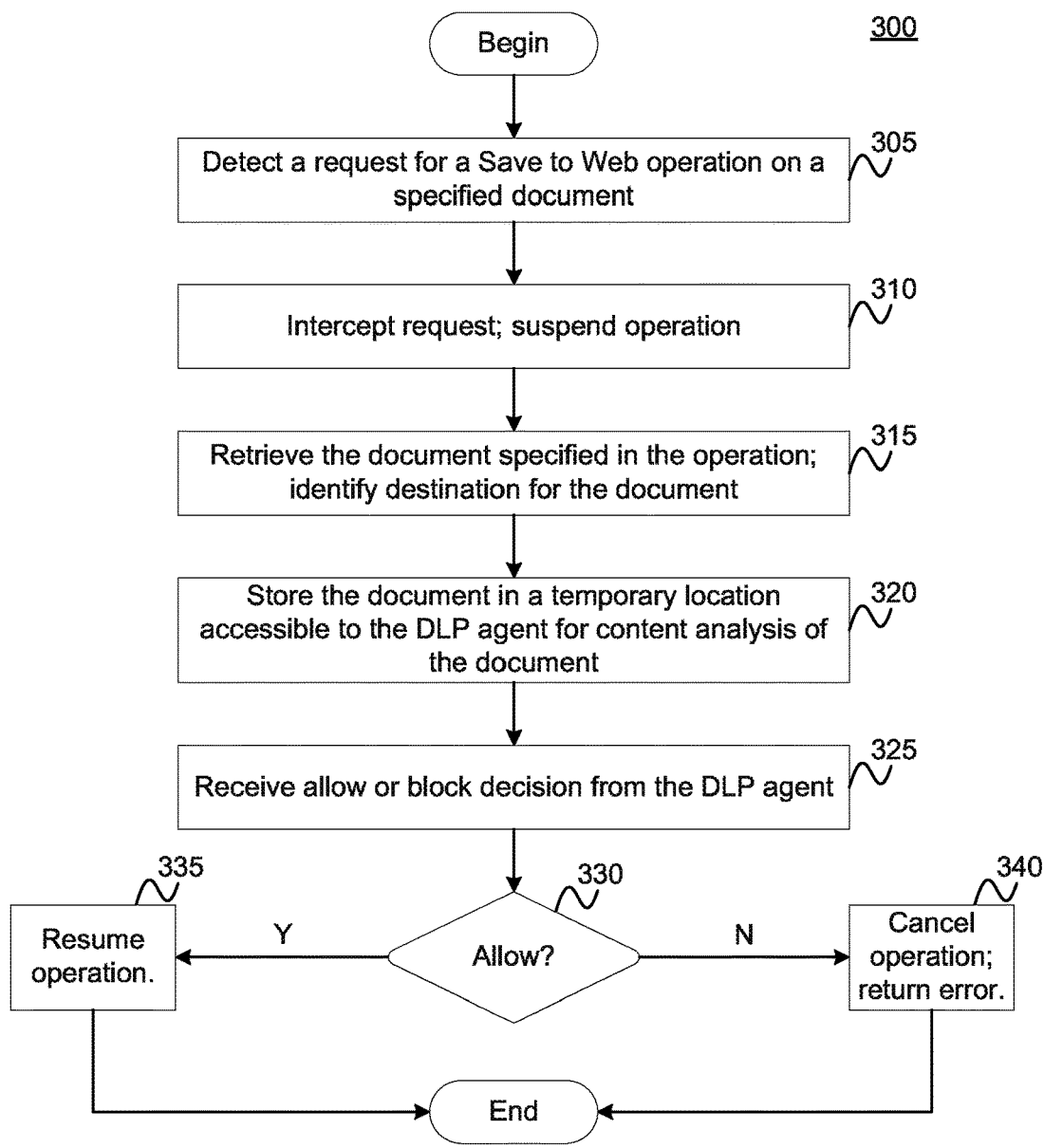
FIG. 3 illustrates a method for saving a file to a remote storage location, according to one embodiment.

FIG. 3 illustrates a method 300 for detecting whether sensitive data is being sent through a Save to Web feature in a productivity application, according to one embodiment. Assume that a user has already opened the productivity application 106 and the DLP agent 108 has integrated the interception component 210 and DLP plug-in 215 with the productivity application 106. As a result, the interception component 210 has access to the file and network APIs of the productivity application 106. Further, assume the user intends to save the file to a directory located in a cloud data repository 114 or publish the file to a web site, such as a social media website or a blog service.

Method 300 begins at step 305, where the interception component 210 detects a request for the productivity application 106 to perform a save operation for a specified document, in particular, a "Save to Web" operation. The interception component 210 can detect that the "Save to Web" operation is initiated if the productivity application 106 performs a write operation to a temporary location on disk known to be used specifically by the application 106 for caching files prior to saving to a remote location.

At step 310, the interception component 210 intercepts the request, suspending the save operation. At step 315, the retrieval component 216 identifies the document specified in the save operation. The retrieval component 216 then obtains an active document object using the IDTExtensibility2 interface. As stated, the active document object is a version of the file that includes all currently unsaved data, in addition to the complete document. Further, the identification component 217 determines a save destination for the file. Continuing the previous example, the identification component 217 may obtain a network address for the storage service 113 as well as the complete file path within the data repository 114, where the save is intended to be saved.

At step 320, the storage component 218 encrypts the active document and saves the encrypted document in a temporary location on a hard disk on the client computer 105. As stated, the temporary location is accessible to the DLP agent 108. The communication component 219 may relay the save operation information (e.g., filename, destination address, destination file path) as well as the temporary file location to the DLP agent 108. The DLP agent 108 can then evaluate the file content as well as the save operation information relative to the policies 122. For example, the DLP agent 108 evaluates where the destination address is on a block list according to the policies 122. As another example, the DLP agent 108 evaluates the content of the document itself to determine whether the document contains any sensitive data in violation of the policies 122. The DLP agent 108 may send results of the evaluation to the communication component 219, i.e., as an allow decision or a block decision.

At step 330, the communication component 219 receives the decision from the DLP agent 108. If the decision is to allow the save operation, the communication component 219 transmits instructions to the interception component 210 for resuming the save operation (at step 335). In turn, the interception component 210 resumes the save operation. Doing so allows the protocol of the web integration component 205 to save the file into the designated file path in the data repository 114 within the cloud provider. However, if the decision is to block the save operation (at step 340), the communication component 219 transmits instructions to the interception component 210 to terminate the save operation. The interception component 210 can invoke the file API to cause the web integration component 205 to return an error to the user.

Figure 4:
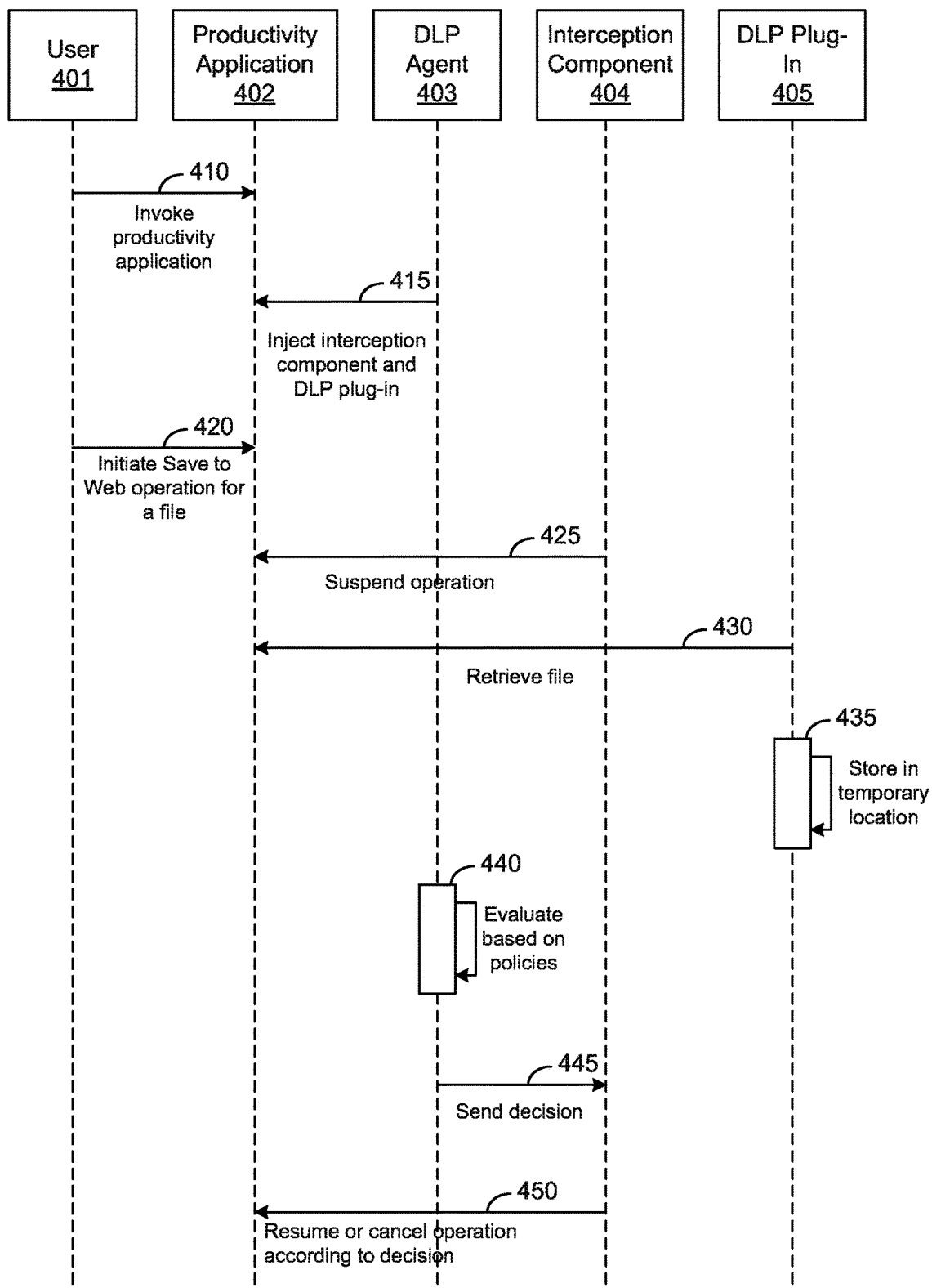
FIG. 4 illustrates a sequence for saving a file to a remote storage location, according to one embodiment.

FIG. 4 illustrates a sequence for detecting whether sensitive data is being sent through a Save to Web feature in a productivity application, according to one embodiment. More specifically, the sequence describes the process in which a user 401 saves a file to a remote location (e.g., a blog service, cloud storage service, etc.) through a productivity application 402 executing on a client computer. At 410, the user 401 invokes the productivity application 402. Doing so causes a DLP agent 403, also executing on the client computer, to inject an interception component 404 and DLP plug-in 405 to the productivity application 402 (at 415). The interception component 404 has access to the file and network APIs.

The user 401 may edit a new or existing file through the productivity application 402. At 420, the user 401 initiates a save operation for a remote destination, in particular, a "Save to Web" operation. In turn, the productivity application 402 caches the file in a temporary directory to prepare for uploading to the remote destination. Because the interception component 404 has access to the file API, the interception component 404 can track writes to the temporary directory and thus detects that the save operation has been initiated. At 425, the interception component 404 suspends the save operation.

At 430, the DLP plug-in 405 retrieves an active document object representing an in-memory version of the file that is persisted on disk. The DLP plug-in 405 encrypts the active document and, at 435, stores the encrypted file in a temporary location that is known and accessible to the DLP agent 403. The interception component 404 communicates the file and destination information to the DLP agent 403.

At 440, the DLP agent 403 evaluates content of the file as well as information about the remote save destination relative to network and security policies. The DLP agent 403 decides whether to allow or block the save operation based on the evaluation, i.e., allow if the file content and destination comply with the policies, block if the file content and destination do not comply. At 445, the DLP agent 403 sends the decision to the interception component 404. At 450, the interception component 404 either resumes or cancels the save operation based on the decision.

Figure 5:
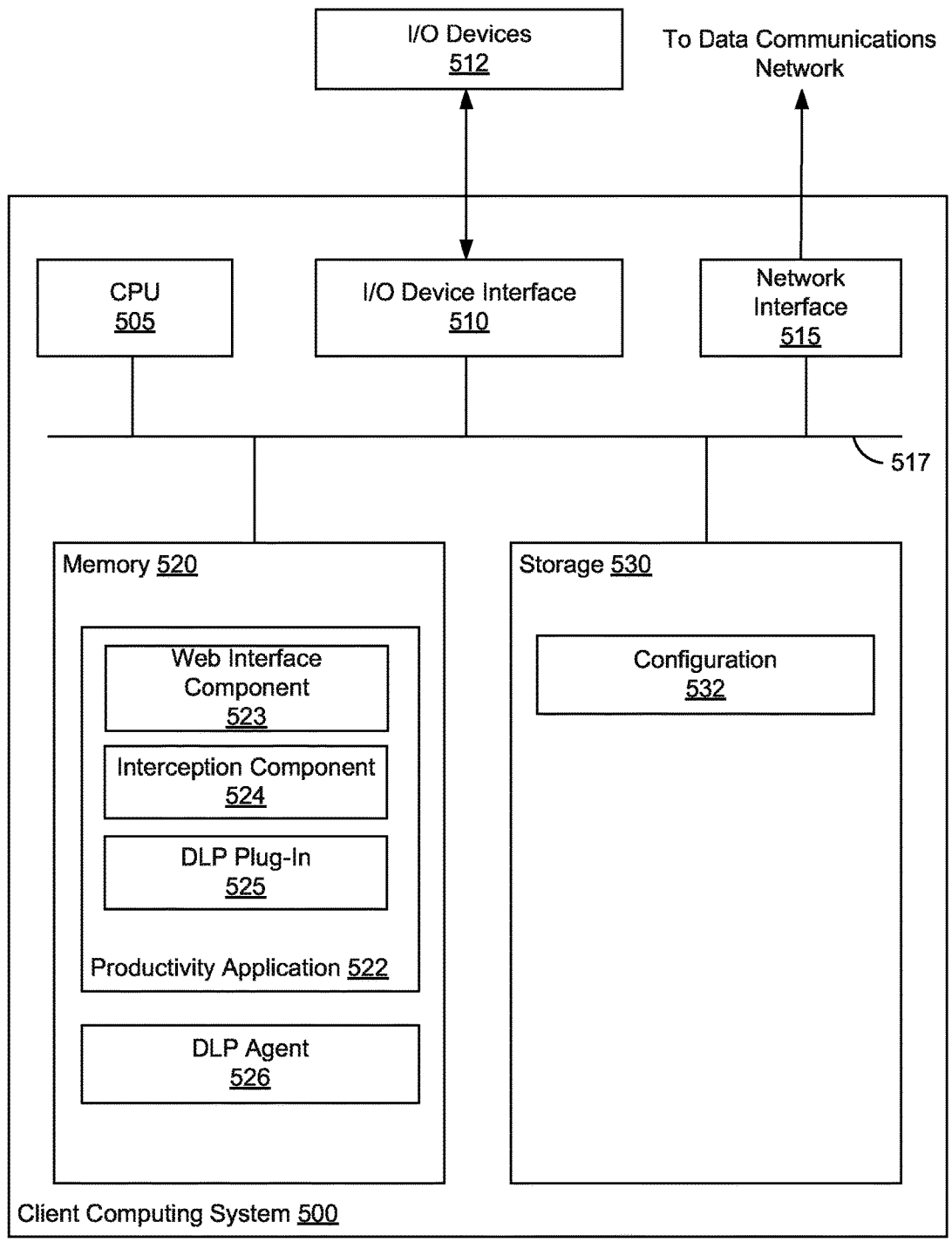
FIG. 5 illustrates an example computing system, according to one embodiment.

FIG. 5 illustrates an example client computing system 500, according to one embodiment. As shown, the computing system 500 includes, without limitation, a central processing unit (CPU) 505, a network interface 515, a memory 520, and storage 530, each connected to a bus 517. The client computing system 500 may also include an I/O device interface 510 connecting I/O devices 512 (e.g., keyboard, mouse, and display devices) to the computing system 500. Further, in context of this disclosure, the computing elements shown in computing system 500 may correspond to a physical computing system (e.g., a system in a data center) or may be a virtual computing instance executing within a computing cloud.

The CPU 505 retrieves and executes programming instructions stored in the memory 520 as well as stores and retrieves application data residing in the memory 520. The interconnect 517 is used to transmit programming instructions and application data between the CPU 505, I/O devices interface 510, storage 530, network interface 515, and memory 520. Note, CPU 505 is included to be representative of a single CPU, multiple CPUs, a single CPU having multiple processing cores, and the like. And the memory 520 is generally included to be representative of a random access memory. The storage 530 may be a disk drive storage device. Although shown as a single unit, the storage 530 may be a combination of fixed and/or removable storage devices, such as fixed disc drives, removable memory cards, or optical storage, network attached storage (NAS), or a storage area-network (SAN).

Illustratively, the memory 520 includes a productivity application 522 and a DLP agent 526. The storage 530 includes a configuration 532. The productivity application 522 allows a user to create and edit files. Further, the productivity application 522 includes a web interface component 523 that allows the user to save a file directly to a remote location over a network.

The DLP agent 526 includes a configuration 532 that specifies applications known to have web integration features, such as the productivity application 522. The DLP agent 526 monitors data being sent over the network from those applications. In one embodiment, the DLP agent 526 communicates with a DLP system, which maintains a set of DLP policies. The DLP agent 526 analyzes file content and save destination information based on the DLP policies.

In one embodiment, the DLP agent 526 injects an interception component 524 and a DLP plug-in 525 when the user opens the productivity application 522. The interception component 524 accesses file and network APIs of the of the productivity application 522. Doing so allows the interception component 524 to detect when a user initiates a save operation.

When the user initiates a save operation for a file, the interception component 524 suspends the save operation through the file API. Further, the DLP plug-in 525 encrypts and stores the file (including unsaved data) in a temporary location accessible to the DLP agent 526. The interception component 524 communicates the file and save destination information to the DLP agent 526. In turn, the DLP agent 526 analyzes the file and save destination information to based on the network and security policies. Doing so allows the DLP agent 526 to determine whether the save operation should be allowed or blocked. The DLP agent 526 can send the determination to the interception component 524, which either allows or blocks the save operation based on the determination.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function (s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments of the present disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources. A user can access any of the resources that reside in the cloud at any time, and from anywhere across the Internet.

The foregoing description, for purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present disclosure, other and further embodiments of the disclosure may be devised without departing from the basic scope thereof, and the scope thereof is determined by the claims that follow.

What is claimed is:

1. A method for preventing data loss by monitoring publication features of an application, the method comprising:

detecting, by a data loss prevention (DLP) agent executing on a hardware processor, a request for the application to save an active document object to a file at a remote location, wherein the DLP agent comprises a plug-in adding DLP functionality to the application;

suspending, by the DLP agent, the request;

retrieving, by the DLP agent, an in-memory version of the active document object including unsaved content by invoking one or more application programming interface (API) components for the application through a plug-in interface of the application;

storing, by the DLP agent, the in-memory version of the active document object including the unsaved content in a temporary location accessible to the DLP agent and distinct from a temporary location used by the application;

evaluating, by the DLP agent, the unsaved content included in the in-memory version of the active document object and an identity of the remote location against a security policy; and based on the evaluation by the DLP agent, either resuming or canceling the request to save the active document object to the file at the remote location.

2. The method of claim 1, further comprising, prior to storing the active document object in the temporary location accessible to the DLP agent, encrypting the active document object.

3. The method of claim 1, wherein the remote location is a data repository hosted by a cloud provider.

4. The method of claim 1, wherein detecting the request comprises monitoring write operations performed by the application to the temporary location used by the application.

5. The method of claim 4, wherein the write operations cache a copy of the active document object at the temporary location used by the application prior to saving the active document object to the file at the remote location.

6. The method of claim 1, wherein the security policy includes rules for determining whether the in-memory version of the active document object includes content prohibited from being sent to the remote location.

7. A non-transitory computer-readable storage medium storing instructions, which, when executed on a hardware processor, perform an operation for preventing data loss by monitoring publication features of an application, the operation comprising:
- detecting, by a data loss prevention (DLP) agent executing on the hardware processor, a request for the application to save an active document object to a file at a remote location, wherein the DLP agent comprises a plug-in adding DLP functionality to the application;
- suspending, by the DLP agent, the request;
- retrieving, by the DLP agent, an in-memory version of the active document object including unsaved content by invoking one or more application programming interface (API) components for the application through a plug-in interface of the application;
- storing, by the DLP agent, the in-memory version of the active document object including the unsaved content in a temporary location accessible to the DLP agent and distinct from a temporary location used by the application;
- evaluating, by the DLP agent, the unsaved content included in the in-memory version of the active document object and an identity of the remote location against a security policy; and
- based on the evaluation by the DLP agent, either resuming or canceling the request to save the active document object to the file at the remote location.

8. The computer-readable storage medium of claim 7, wherein the operation further comprises, prior to storing the active document object in the temporary location accessible to the DLP agent, encrypting the active document object.

9. The computer-readable storage medium of claim 7, wherein the remote location is a data repository hosted by a cloud provider.

10. The computer-readable storage medium of claim 7, wherein detecting the request comprises monitoring write operations performed by the application to the temporary location used by the application.

11. The computer-readable storage medium of claim 10, wherein the write operations cache a copy of the active document object at the temporary location used by the application prior to saving the active document object to the file at the remote location.

12. The computer-readable storage medium of claim 7, wherein the security policy includes rules for determining whether the in-memory version of the active document object includes content prohibited from being sent to the remote location.

13. A system comprising:
- a hardware processor; and
- a memory hosting a program, which, when executed on the hardware processor, performs an operation for preventing data loss by monitoring publication features of an application, the operation comprising:
  - detecting, by a data loss prevention (DLP) agent executing on the hardware processor, a request for the application to save an active document object to a file at a remote location, wherein the DLP agent comprises a plug-in adding DLP functionality to the application;
  - suspending, by the DLP agent, the request;
  - retrieving, by the DLP agent, an in-memory version of the active document object including unsaved content by invoking one or more application programming interface (API) components for the application through a plug-in interface of the application;
  - storing, by the DLP agent, the in-memory version of the active document object including the unsaved content in a temporary location accessible to the DLP agent and distinct from a temporary location used by the application;
  - evaluating, by the DLP agent, the unsaved content included in the in-memory version of the active document object and an identity of the remote location against a security policy; and
  - based on the evaluation by the DLP agent, either resuming or canceling the request to save the active document object to the file at the remote location.

14. The system of claim 13, wherein the operation further comprises, prior to storing the active document object in the temporary location accessible to the DLP agent, encrypting the active document object.

15. The system of claim 13, wherein the remote location is a data repository hosted by a cloud provider.

16. The system of claim 13, wherein detecting the request comprises monitoring write operations performed by the application to the temporary location used by the application.

17. The system of claim 16, wherein the write operations cache a copy of the file at the temporary location used by the application prior to saving the active document object to the file at the remote location.

* * * * *